United States Patent
Elgressy et al.

(10) Patent No.: US 7,383,569 B1
(45) Date of Patent: Jun. 3, 2008

(54) METHOD AND AGENT FOR THE PROTECTION AGAINST THE UNAUTHORIZED USE OF COMPUTER RESOURCES

(75) Inventors: Doron Elgressy, Haifa (IL); Fabian Ben Aderet, Migdal Haemek (IL)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/622,959

(22) PCT Filed: Feb. 25, 1999

(86) PCT No.: PCT/IL99/00113

§ 371 (c)(1),
(2), (4) Date: Dec. 11, 2000

(87) PCT Pub. No.: WO99/45454

PCT Pub. Date: Sep. 10, 1999

(30) Foreign Application Priority Data

Mar. 2, 1998 (IL) ...................................... 123512

(51) Int. Cl.
*G06F 7/04* (2006.01)
*G06F 17/30* (2006.01)
*G06F 15/16* (2006.01)

(52) U.S. Cl. .................. 726/2; 726/3; 726/4; 726/21; 713/164; 709/229

(58) Field of Classification Search ................ 713/200, 713/201, 164; 726/2–4, 16–18, 21; 709/202, 709/223, 226, 229; 714/38
See application file for complete search history.

(56) References Cited

U.S. PATENT DOCUMENTS 5,859,966 A * 1/1999 Hayman et al. ............ 713/200
5,983,348 A * 11/1999 Ji ............................... 713/200
5,987,523 A * 11/1999 Hind et al. .................. 709/245

(Continued)

FOREIGN PATENT DOCUMENTS

EP 0456386 A1 4/1991

(Continued)

*Primary Examiner*—MinhDieu Nguyen
(74) *Attorney, Agent, or Firm*—Baker Botts L.L.P.

(57) ABSTRACT

Method and agent for preventing a hostile use of computer resources by an application running on a workstation. A list of services that are not allowed for access by unspecified applications is determined, and when such unspecified application runs on the workstation, direct access to the application is prevented from any resource. Any direct or indirect request for access to specific services is analyzed, to determine whether such request is allowable according to the list. The workstation processes the request if it is allowable. The unspecified application is prevented from accessing the requested resource if the request is not allowable. The resource may be any local or remote resource, such as, memory allocation, files, directories, operations with files and directories, such as copy, delete or compress, or any other operation leading to a permanent change in the workstation or its periphery. A look-up table which includes a list of services that are not allowed for access by unspecified applications, is used to determine whether requests made directly or indirectly by the unspecified application are allowable. The agent comprises a pre-set list of applications including a list of resources that each application may utilize.

24 Claims, 3 Drawing Sheets

U.S. PATENT DOCUMENTS

| | | | |
|---|---|---|---|
| 6,092,194 A * | 7/2000 | Touboul | 713/200 |
| 6,167,522 A * | 12/2000 | Lee et al. | 713/201 |
| 6,233,576 B1 * | 5/2001 | Lewis | 707/9 |
| 6,449,723 B1 * | 9/2002 | Elgressy et al. | 713/201 |

FOREIGN PATENT DOCUMENTS

| | | |
|---|---|---|
| EP | 0561509 | 9/1993 |
| EP | 570123 A1 | 11/1993 |
| GB | 2312767 | 11/1997 |
| WO | WO9704394 | 2/1997 |
| WO | 9821683 | 5/1998 |

* cited by examiner

METHOD AND AGENT FOR THE PROTECTION AGAINST THE UNAUTHORIZED USE OF COMPUTER RESOURCES

FIELD OF THE INVENTION

The present invention relates to the security management of computers. More particularly, the invention relates to a method and an agent for preventing the access to the use of computer resources by hostile applications.

BACKGROUND OF THE INVENTION

The Internet has developed very much both in respect of its contents and of the technology employed, since it began a few years ago. In the early days of the Internet, web sites included text only, and after a while graphics was introduced. As the Internet developed, many compressed standards, such as pictures, voice and video files, were developed and with them programs used to play them (called "players"). Initially, such files were downloaded to the user's workstation only upon his request, and extracted only by the appropriate player, and after a specific order from the user.

When, in the natural course of the development of the World Wide Web the search for a way to show nicer, interactive and animated Web Pages began, Sun Microsystems Inc. developed Java—a language that allows the webmaster to write a program, a list of commands—Network Executables—that will be downloaded to the user workstation most of the time without his knowledge, and executed by his browser at his workstation. The executables are used, e.g., to provide photographic animation and other graphics on the screen of the web surfer. Such executables have ways of approaching the user workstation's resources, which lead to a great security problem. Although some levels of security were defined in the Java language, it was very soon that a huge security hole was found in the language.

Since Java was developed, Microsoft developed ActiveX, which is another Network Executable format, also downloaded into the workstation. ActiveX has also security problems of the same kind.

The Internet has been flooded with "Network Executables" which may be downloaded—deliberately or without the knowledge of the users—into workstations within organizations. These codes generally contain harmless functions. Although usually safe, they may not meet the required security policy of the organization.

Once executed, codes may jam the network, cause considerable irreversible damage to the local database, workstations and servers, or result in unauthorized retrieval of information from the servers/workstations. Such elements may appear on Java applets, ActiveX components, DLLs and other object codes, and their use is increasing at an unparalleled pace. The majority of these small programs are downloaded into the organization unsolicited and uncontrolled. The enterprise has no way of knowing about their existence or execution and there is no system in place for early detection and prevention of the codes from being executed.

The problem is made worse, in some cases, by the existence of large intranets and LANs, which may also be used by unauthorized persons to access workstations and perform hostile activities thereon.

The security problem was solved partially by the browser manufactures which allow the user to disable the use of executables. Of course this is not a reasonable solution, since all the electronic commerce and advertising are based on the use of executables.

In three copending patent applications of the same applicants hereof, IL 120420, filed Mar. 10, 1997, IL 121815, filed Sep. 22, 1997, and IL 122314, filed Nov. 27, 1997, the descriptions of which are incorporated herein by reference, there are described methods and means for preventing undesirable Executable Objects from infiltrating the LAN/WAN in which we work and, ultimately, our workstation and server. IL 122314 further provides a method for enforcing a security policy for selectively preventing the downloading and execution of undesired Executable Objects in an individual workstation.

While much has been done in the abovementioned patent applications toward protecting the individual workstation, one problem yet remained unsolved: the hostile use of local resources by applications which have passed any earlier security check (e.g., a gateway security policy), because they did not contravene such security policy, or by applications which have not passed through an earlier check point (such as a gateway equipped with a security policy check, as described in the aforementioned Israeli patent applications), either because such earlier point of check is not available, or because the application has been loaded directly on the workstation. Such hostile use of CPU resources may lead to damage to the data, operation and hardware of the workstation and, under the conditions contemplated above, may go undetected until the damage is done.

It is an object of the present invention to provide a method and agent which overcomes the aforesaid drawbacks of prior art methods, and which provides effective protection at the workstation level.

It is another object of the present invention to provide a method and an agent which can be used effectively to prevent the hostile use of workstation resources by applications running on said workstation.

Other objects and advantages of the invention will become apparent as the description proceeds.

SUMMARY OF THE INVENTION

In one aspect, the invention is directed to a method for preventing an hostile use of computer resources by an application running on a workstation, comprising the steps of:

a) providing a list of services that are not allowed for access by unspecified applications;

b) when such unspecified application runs on the workstation, preventing said application from accessing any resource directly;

c) analyzing any direct or indirect request for access to specific services, to determine whether such request is allowable according to the list defined under a) above;

d) if the request is allowable, allowing the workstation to process it; and e) if the request is not allowable, preventing the unspecified application from accessing the requested resource;

wherein said resource may be any local or remote resource, including, but not limited to, memory allocation, files, directories, operations with files and directories, such as copy, delete or compress, or any other operation leading to a change in the workstation or its periphery. Illustrative—but not limitative—examples of such operations include access to system files, configuration information, network communications, hardware equipment (floppy, modem, etc.), CMOS data (time, date, etc.), or the use of resources such as memory allocation, process creation, threads creation, use of excessive CPU time, use of excessive disk space, use of excessive network communication, and use of excessive graphical resources and use of system or application configuration.

According to a preferred embodiment of the invention the list of services is provided as a look-up table.

By "unspecified application" it is meant to indicate an application that is not specifically identified in a pre-set list of applications. According to a preferred embodiment of the invention, said pre-set list of applications includes a list of resources which each application may utilize.

In another aspect, the invention is directed to an agent for protecting a workstation against the hostile use of computer resources by an unspecified application running on said workstation, comprising:

a) means for detecting an unspecified application or a module of an application running on the workstation;
b) means for determining the requests for resources to be used by said unspecified application;
c) means for identifying chain requests for resources utilization, wherein said chain requests comprise requests made by resources called by said unspecified application;
d) means for determining whether requests made directly by said unspecified application are allowable;
e) means for determining whether requests made indirectly, as chain requests, by said unspecified application would be not allowable if made directly by said unspecified application; and
f) means for preventing said chain request from being processed, if it is determined that the request is not allowable, or that it would not be allowable if made directly by said unspecified application, and for allowing its processing if otherwise determined.

According to a preferred embodiment of the invention, the means for determining whether requests made directly or indirectly by said unspecified application are allowable comprise a look-up table including a list of services that are not allowed for access by unspecified applications. In another preferred embodiment of the invention, the agent comprises a pre-set list of applications including a list of resources that each application may utilize.

All the above and many other characteristics and advantages of the invention, will be better understood through the following illustrative and non-limitative examples of preferred embodiments thereof, with reference to the appended drawings.

DETAILED DESCRIPTION OF PREFERRED EMBODIMENTS

Figure 1:
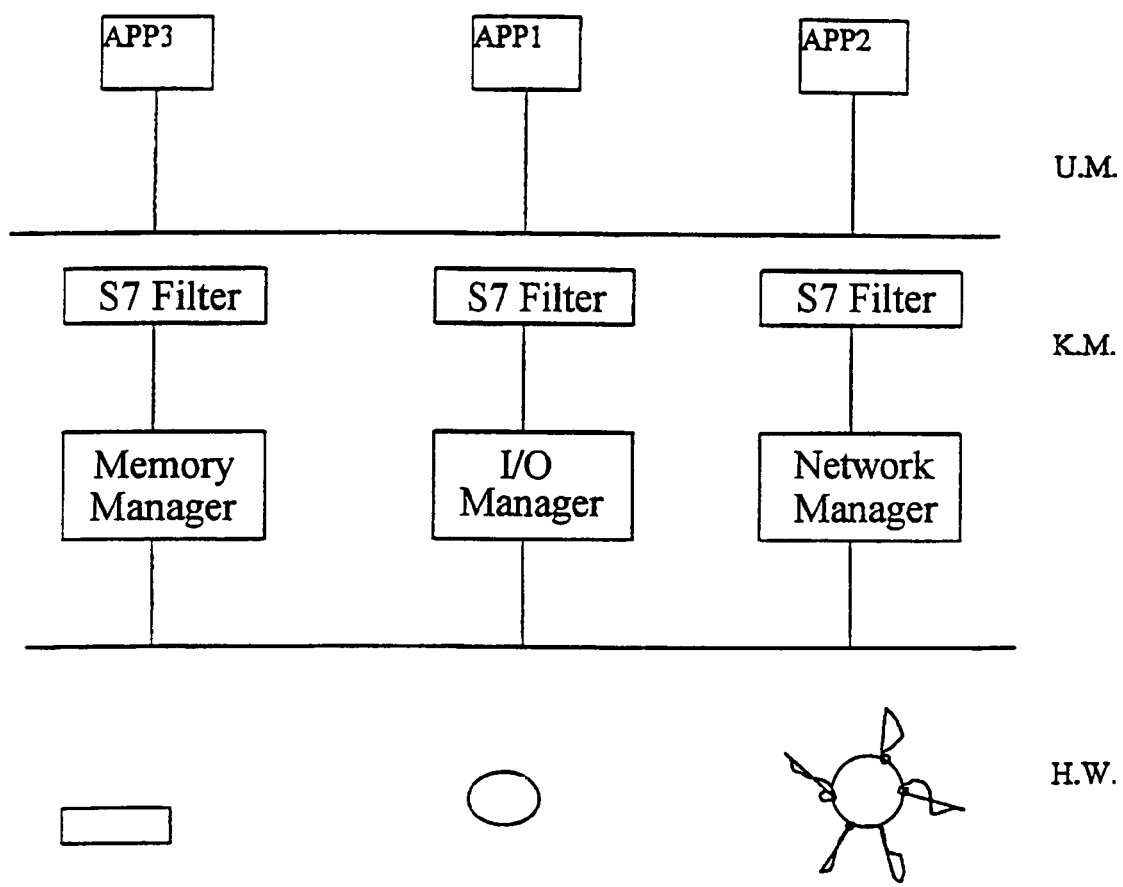
FIG. 1 schematically illustrates different applications and their requests and related operations.
Figure 2:
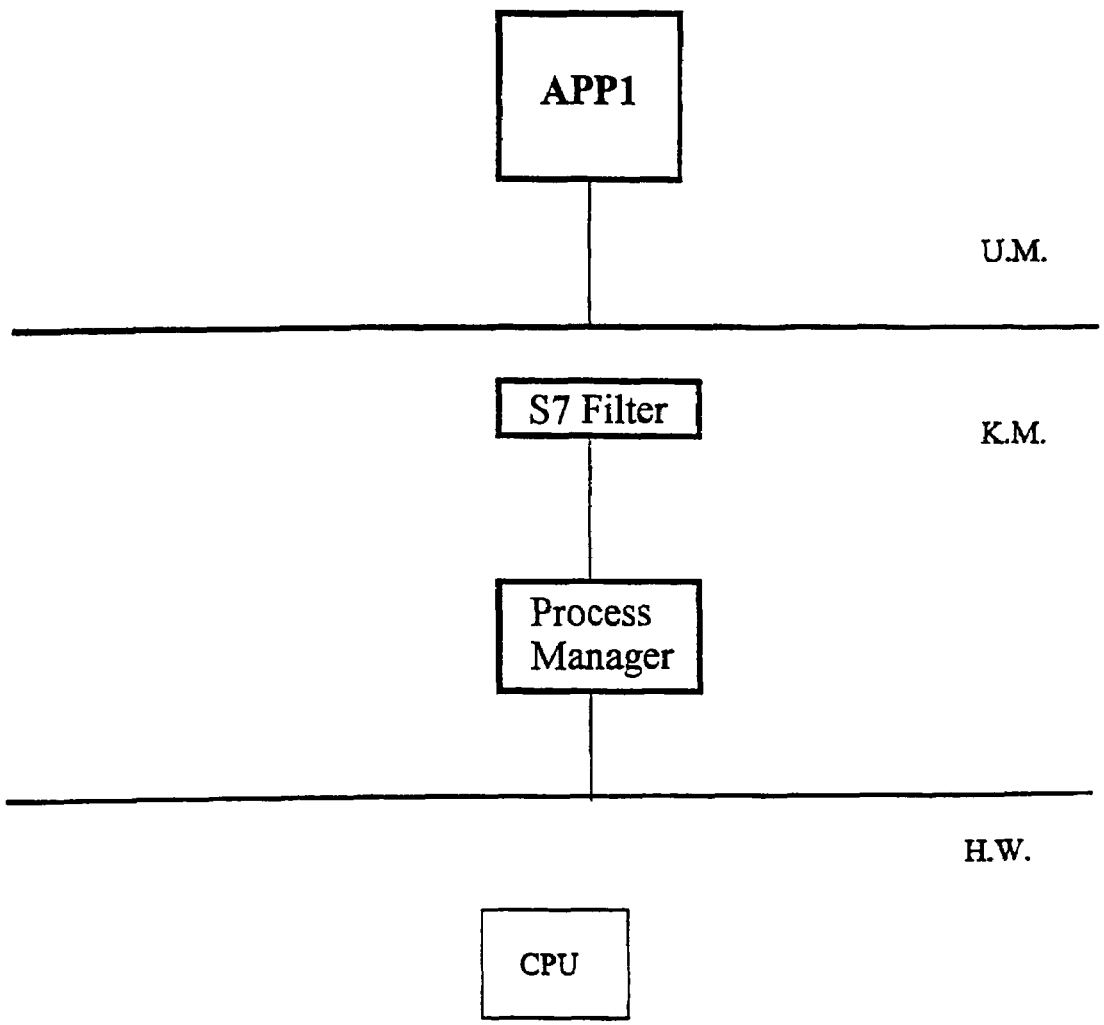
FIG. 2 schematically illustrates a detail of an illustrative application that will cause machine malfunctioning.
Figure 3:
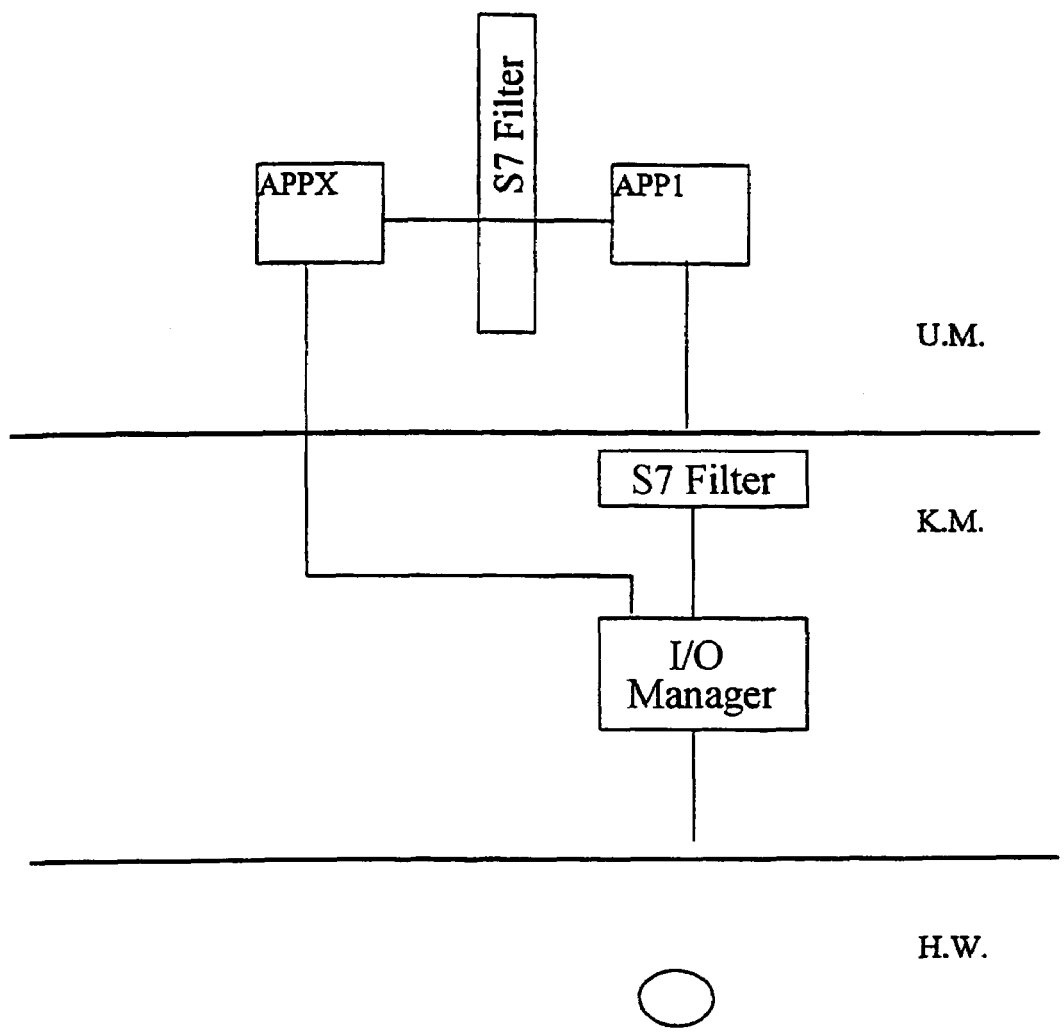
FIG. 3 illustrates a situation in which indirect unallowable resource exploitation is attempted.

Examples of such situations are exemplified in FIGS. 1-3. Referring to FIG. 1, three different applications are shown, marked APP1 through APP3. The process takes place at three different levels: the user mode (indicated by "U.M."), the kernel mode (indicated by "K.M."), and the hardware (indicated by "H.W."). The three different modes are schematically separated in the figure by straight lines. The APP1, APP2 and APP3 applications operate in the user mode. APP1 is an "open file" I/O request. This request is passed on to the I/O manager, which, in turn, refers to the disk(s) to perform the required operation. A filter (indicated as "S7 Filter" in the figure) analyzes the request to determine whether it is permissible according to the security policy. If it is permissible, it is allowed to proceed to the I/O manager, which processes the request with the disk(s).

APP2, on the other hand, makes a request involving the network, i.e., and "open connection to the file server" request. The network manager is allowed to process this request only if the filter S7 has determined that it is permissible. Similarly, APP3 makes a memory allocation request, which is examined by the filter and, if permissible, is passed on to the memory manager and then acted upon in connection with the memory.

The operation of the various requests in the kernel mode and vis-a-vis the hardware, after the filter has examined and allowed them, is the same as with conventional operations in everyday computer, is well known to the skilled person, and therefore is not described herein in detail, for the sake of brevity.

Looking now at FIG. 2, a detail of an illustrative application that will cause machine malfunctioning is shown. In this example APP1 generates 1000 requests to generate new processes. If the system of the invention is not present, the 1000 requests will be passed on to the CPU by the Process Manager, and will use all the resources of the CPU, thus holding the work of the machine. If the filter of the invention is present, however, it may be pre-set to allow the generation of only a limited number of processes by the same application. Therefore, if a number of new processes are requested by a single application, which exceeds the preset limit, the filter S7 will not allow it to pass on to the process manager, thus avoiding the exhaustion of the resources of the machine.

FIG. 3 illustrates a situation in which indirect unallowable resources exploitation is attempted. In this example APP1 is of a type that is not allowed to send a request to the I/O Manager. If it attempts to do so, it is stopped by the S7 Filter, unless the request complies with the Security Policy preset with S7. APP1 may therefore be programmed so as to effect an interprocess communication, viz., to communicate its request to a further process, APPX, which is permitted to make the request that APP1 is not allowed to make, to the I/O/Manager. In this case, the S7 filter between the User Mode and the Kernel Mode is bypassed. In order to prevent such an occurrence, a further filter S7 is located between all communicating processes, and stops any request that is passed on to one process to the other (in the example, from APP1 to APPX), and which the first process is not allowed to make directly.

Of course, as will be apparent to the skilled person, the filter S7 is not a physical filter, but rather a logical one. Logical filters of this kind can be provided in a plurality of ways, using many different analysis processes and criteria, which will be predetermined by the skilled person according to the particular requirements of the system involved. For example, the logic could be implemented in computer readable storage media.

All the above description and examples have therefore been provided for the purpose of illustration only, and are not intended to limit the invention in any way, except as defined by the appended claims.

The invention claimed is:

1. A method for preventing hostile use of computer resources by an application running on a workstation, comprising:

providing, on a workstation, a pre-set list of applications permitted to run on the workstation and a list of one or more computer resources on the workstation that are not accessible to unspecified applications;

providing a filter on the workstation for receiving internal requests for computer resources resident on the workstation;

receiving at the filter a request for access generated by an unspecified application downloaded to the workstation from a source external to the workstation, the request for access identifying a computer resource resident on the workstation to which the unspecified application seeks access;

determining, by the filter on the workstation, that the unspecified application is not identifiable in the pre-set list of applications;

determining, by the filter on the workstation, whether the requested computer resource is on the list of one or more computer resources that are not accessible to unspecified applications;

allowing access to the requested computer resource if the requested computer resource is not on the list of one or more computer resources that are not accessible to unspecified applications; and preventing access to the requested computer resource if the requested computer resource is on the list of one or more computer resources that are not accessible to unspecified applications.

2. The method of claim 1, wherein the list of one or more computer resources that are not accessible to unspecified applications comprises a look-up table.

3. The method of claim 1, wherein the requested computer resource is selected from the group consisting of a memory allocation, a file, and a directory.

4. The method of claim 1, wherein the requested computer resource is selected from the group consisting of a copy command, a delete command, and a compress command.

5. The method of claim 1, wherein the requested computer resource comprises an operation that when performed leads to a permanent change in the workstation.

6. The method of claim 1, wherein receiving the request comprises receiving a direct request generated by the unspecified application.

7. The method of claim 1, wherein receiving the request comprises receiving an indirect request generated by the unspecified application.

8. The method of claim 1, wherein the list of one or more computer resources that are not accessible to unspecifed applications comprises a list of one or more computer resources that the unspecified application may use during operations performed by the unspecified application.

9. A workstation for preventing hostile use of computer resources by an application running on the workstation, comprising:

a memory operable to store one or more applications, at least one application comprising an unspecified application received from the network as a downloadable application; and a processor on a workstation coupled to the memory and operable to:

maintain a pre-set list of applications permitted to run on the workstation and a list of one or more computer resources on the workstation that are not accessible to any unspecified applications;

in response to a request received from the unspecified application, determine that the unspecified application is not identifiable in the pre-set list of applications;

determine whether a requested computer resource is on the list of one or more computer resources on the workstation that are not accessible to any unspecified applications;

allow access to the requested computer resource if the requested computer resource is not on the list of one or more computer resources that are not accessible to any unspecified applications; and prevent access to the requested computer resource if the requested computer resource is on the list of one or more computer resources that are not accessible to any unspecifed applications.

10. The workstation of claim 9, wherein the list of one or more computer resources that are not accessible to any unspecified applications comprises a look-up table.

11. The workstation of claim 9, wherein the requested computer resource is selected from the group consisting of a memory allocation, a file, and a directory.

12. The workstation of claim 9, wherein the requested computer resource is selected from the group consisting of a copy command, a delete command, and a compress command.

13. The workstation of claim 9, wherein the requested computer resource comprises an operation that when performed leads to a permanent change in the workstation.

14. The workstation of claim 9, wherein the request from the unspecified application comprises a direct request.

15. The workstation of claim 9, wherein the request from the unspecified application comprises an indirect request.

16. The workstation of claim 9, wherein the list of one or more computer resources that are not accessible to any unspecified applications comprises a list of one or more computer resources that the unspecified application may use during operations performed by the unspecified application.

17. Logic for preventing hostile use of computer resources by an application running on a workstation, the logic encoded in computer readable storage media and operable when executed to:

maintain, on a workstation, a pre-set list of applications permitted to run on the workstation and a list of one or more computer resources on the workstation that are not accessible to unspecified applications;

provide a filter on a workstation for receiving internal requests for computer resources resident on the workstation;

receive at the filter a request for access generated by an unspecified application downloaded to the workstation from a source external to the workstation, the request for access identifying a computer resource resident on the workstation to which the unspecified application seeks access;

determine, by the filter on the workstation, that the unspecified application is not identifiable in the pre-set list of applications permitted to run on the workstation;

determine, by the filter on the workstation, whether the requested computer resource is on the list of one or more computer resources that are not accessible to unspecified applications;

allow access to the requested computer resource if the requested computer resource is not on the list of one or more computer resources that are not accessible to unspecified applications; and prevent access to the requested computer resource if the requested computer resource is on the list of one or more computer resources that are not accessible to unspecified applications.

18. The logic of claim 17, wherein the list of one or more computer resources that are not accessible to any unspecified applications comprises a look-up table.

19. The logic of claim 17, wherein the requested computer resource is selected from the group consisting of a memory allocation, a file, and a directory.

20. The logic of claim 17, wherein the requested computer resource is selected from the group consisting of a copy command, a delete command, and a compress command.

21. The logic of claim 17, wherein the requested computer resource comprises an operation that when performed leads to a permanent change in the workstation.

22. The logic of claim 17, wherein receiving the request comprises receiving a direct request generated by the unspecified application.

23. The logic of claim 17, wherein receiving the request comprises receiving an indirect request generated by the unspecified application.

24. The logic of claim 17, wherein the list of one or more computer resources that are not accessible to any unspecified applications comprises a list of one or more computer resources that the unspecified application may use during operations performed by the unspecified application.

* * * * *